(12) United States Patent
Shyy et al.

(10) Patent No.: US 6,888,817 B1
(45) Date of Patent: May 3, 2005

(54) METHOD AND APPARATUS FOR POSITIONING A MOBILE STATION IN A TDMA SYSTEM

(75) Inventors: Dong-Jye Shyy, Taichung (TW); Cheng Lung Lin, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/575,567

(22) Filed: May 22, 2000

(30) Foreign Application Priority Data

Feb. 1, 2000 (TW) .................................... 89101681 A

(51) Int. Cl.[7] .............................................. H04B 7/212
(52) U.S. Cl. ...................................... 370/347; 455/522
(58) Field of Search ............................... 370/347, 252, 370/335, 318–320, 468, 337; 455/73, 115.3, 117, 126, 226, 522, 2.01, 433, 443, 502, 456.3, 456.2, 456.5, 434, 425, 432.1; 325/144–148; 130/150; 340/343–349, 341, 219, 297; 342/450, 457, 465

(56) References Cited

U.S. PATENT DOCUMENTS

| | | | |
|---|---|---|---|
| 4,829,554 A | * | 5/1989 | Barnes et al. ............. 455/432.1 |
| 5,604,765 A | | 2/1997 | Bruno et al. |
| 5,838,674 A | * | 11/1998 | Forssen et al. ............. 370/337 |
| 5,953,665 A | * | 9/1999 | Mattila ........................ 455/434 |
| 6,052,597 A | * | 4/2000 | Ekstrom ................... 455/456.3 |
| 6,097,959 A | * | 8/2000 | Yost et al. ................ 455/456.2 |
| 6,112,082 A | * | 8/2000 | Almgren et al. ............ 455/425 |
| 6,366,781 B1 | * | 4/2002 | Hussain et al. ........... 455/456.5 |
| 6,421,009 B2 | * | 7/2002 | Suprunov .................... 342/465 |
| 6,430,402 B1 | * | 8/2002 | Agahi-Kesheh .......... 455/115.3 |
| 6,621,808 B1 | * | 9/2003 | Sadri .......................... 370/335 |

* cited by examiner

*Primary Examiner*—Chi Pham
*Assistant Examiner*—Prenell Jones
(74) *Attorney, Agent, or Firm*—Darby & Darby

(57) ABSTRACT

A method and apparatus for positioning a mobile station in a Time-Division Multiple Access (TDMA) communication system are disclosed. The apparatus comprises a plurality of power detectors respectively located at predetermined positions and at least one controller coupled to the power detectors. The power detectors respectively measure a plurality of power values of the signal generated by the mobile station in a preset channel and a preset time slot, which are allocated to the handset by the TDMA communication system. The at least one controller is able to identify the handset according to the preset channel and the preset time slot and to determine the position of the handset according to at least one of the plurality of power values measured and the position of the corresponding detector.

18 Claims, 3 Drawing Sheets

METHOD AND APPARATUS FOR POSITIONING A MOBILE STATION IN A TDMA SYSTEM

BACKGROUND OF THE INVENTION

1. Field of the Invention

This invention relates to a positioning technique. In particular, it relates to a method and apparatus for positioning a mobile station in a Time-Division Multiple Access (TDMA) communication system.

2. Description of the Related Art

Wireless telephony has become a popular form of communication in recent years. Furthermore, the value of positioning services, whereby the location of a user is pinpointed, has been recognized. Thus, using the same personal communication equipment as the platform for voice/data communication and positioning service would be both convenient and cost-saving. The positioning service is provided using the existing communication system, wherein a wireless handset is used for communication and serving as the signal source to be located.

Outdoor positioning techniques have been well developed. For example, the Global Positioning System (GPS) and multiple-base-station system utilize GPS satellites and base stations, respectively, to determine a user's position. However, these techniques have their limitations in the indoor application. For example, for the GPS technique, the GPS signal has difficulty penetrating an indoor wall. For the multiple-base-station technique, a user may not be able to see 3 or more base stations.

Several solutions have been proposed to provide the solutions of indoor positioning. As disclosed in U.S. Pat. No. 5,604,765, a signal similar to the GPS spread spectrum is incorporated in a handset or other personal communication equipment. However, using this technique, it is necessary to use a general GPS receiver to decode the signal which incurs additional cost. Another method is to increase the number of base stations to enhance the probability that the handset signal will be received, but adds substantial cost. Another way is to use a distributed antenna technique wherein the antenna is applied as a relay located between the base station and the mobile station (for example, a handset), thereby extending the coverage area of the antenna. However, this is more appropriate to a Code-Division Multiple Access (CDMA) system or spread spectrum system. It does not work well in the TDMA system because of the signal multipath phenomenon, which causes a severe intersymbol interference (ISI).

The 3D-ID technique developed by Pinpoint Corporation utilizes the GPS concept. In place of GPS positioning satellites, it utilizes mounted indoor nodes to function as the GPS satellite. A specific unit such as a handset receives a spread spectrum signal from each node and transforms the received signal into another frequency, which it sends out the changed frequency signal with an identifier in a Phase Modulation (PM) manner. After receiving these returned signals from the specific unit, the system controller determines the position of the specific unit by three point positioning technique. However, this method requires setting up a large number of GPS nodes. Further, these nodes not only have to receive and transmit the signal, but also process the modulation data in the signal. Therefore, the cost of the nodes is high.

SUMMARY OF THE INVENTION

Accordingly, an object of this invention is to provide a method and apparatus for positioning a mobile station in a TDMA communication system that is low cost and suited for the indoor environment.

To realize the above and other objectives, this invention provides a TDMA communication system positioning apparatus to determine a mobile station position, comprising: a plurality of power detectors to be located in a plurality of predetermined detector positions, respectively, thereby respectively measuring a plurality of power values of the signal in a specific channel and time slot corresponding to a certain mobile station; and at least one controller, coupled to the detectors, to identify the certain mobile station based on the specific channel and time slot, and to determine the position of the certain mobile station based on at least one resulting value over a predetermined power value and the respective position of the detector used to measure the at least one resulting value. The controller is preferably configured in the base station of the TDMA system. The power detector is connected to the controller by a cable or a wireless channel.

The controller can determine the position of a mobile station in three ways. First, if power detectors are distributed in a high density, the position of a mobile station is located onto the position of the detector having the maximum measured power value. Second, if at least three power detectors are used, the position of a mobile can be determined by using the three-point positioning technique. In this method, the three power detectors are preferably the closest ones to the handset such that the largest three power values can be used to determine the position. Further, if a known obstacle is present, the relative distance between the handset and the known obstacle is first determined. Thereafter, the weight of each power value is adjusted according to the known relative distance. Thereby, the position of the mobile station is determined by the adjusted power value. Third, a predetermined positioning look-up table stored in the controller is used to record the relationship between known mobile positions and power values measured by each detector. Therefore, when the controller receives the power values measured by the power detectors, the position of the mobile station is determine according to the look-up table.

If a voice signal is transferred between the mobile station and the base station, the voice signal is directly measured by the detectors. On the other hand, if no voice signal exists, he base station of the TDMA communication system pages the mobile station and uses the response signal of the mobile station for the power measurement. In addition, the controller sends a time slot message signal to each power detector, before performing the power measurement, to synchronize the power detectors with the time slot boundary of the TDMA communication system.

This invention utilizes simple RF receivers as power detectors. Thus, a RF transmitter and baseband processing portion are not necessary. Thereby, the implementation cost is low.

This invention also discloses a method of positioning a mobile station in a TDMA communication system. A Plurality of power detectors are first set up at a plurality of known positions. Next, a plurality of power values of a signal generated by the mobile station are measured in a specific channel and time slot. Then, the specific mobile station to be positioned is identified based on the specific channel and time slot. Finally, the position of the specific mobile station is determined according to the measured power values that are over a predetermined power value and the coordinate position of the power detectors by using the three-point positioning method or a preset look-up table.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE INVENTION

To realize the above and other objectives, this invention provides an apparatus for measuring the power of a signal emitted by a specific mobile station, wherein the values of the signal are used to determine the location of the mobile station in the TDMA communication system. In the embodiments described, the mobile station is a handset. However, it is understood that the invention is not limited only to a handset. Any kind of TDMA wireless device may be positioned. Further, this invention can be adapted for any known or developing TDMA system, for example, GSM, DECT, IS-136, PACS, PHS, JDC, GPRS and TDD mode of W-CDMA.

Figure 1:
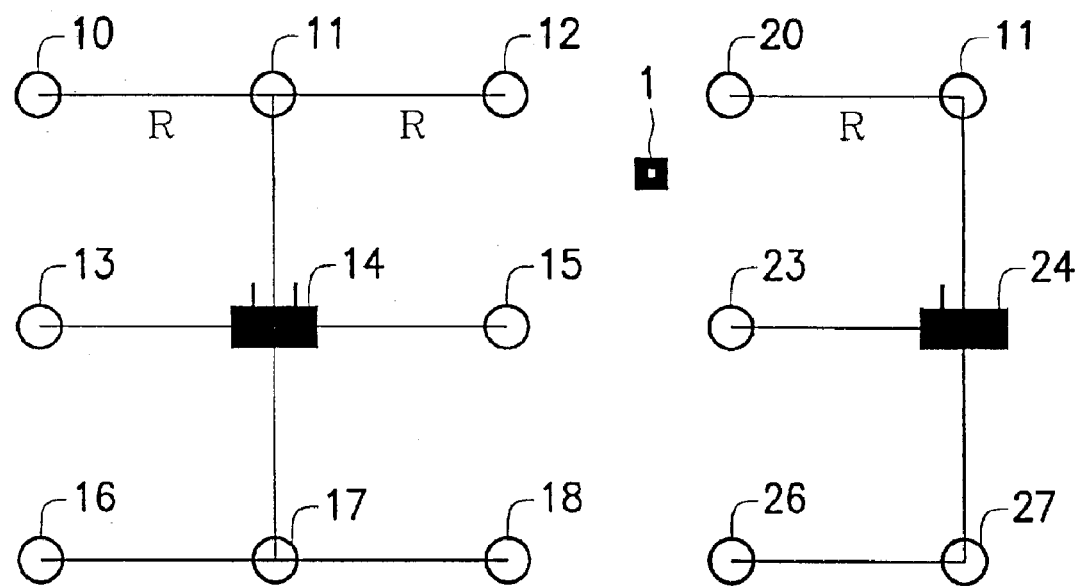
FIG. 1 is a block diagram illustrating the TDMA communication system positioning apparatus according to an embodiment of this invention.

Refer to FIG. 1, a block diagram illustrating a TDMA communication system positioning apparatus according to the first embodiment of this invention.

In FIG. 1, this processing apparatus comprises: a plurality of power detectors located around base stations 14, 24, and at least one controller (not shown). In this embodiment, power detectors 10–13 and 15–18 around base station 14 and power detectors 20,21,23,26,27 around base station 24 are provided. Base stations 14 and 24 belong to a TDMA communication system, which could include additional bases stations. In this embodiment, all power detectors are separated by a fixed distance R to form a checkered configuration. However, a topology other than checkering is allowed. For example, a ring with a fixed distance around a base station is possible. The configuration of the power detectors requires only that the coordinate position of each detector is known, and that a wide enough area is covered to detect and receive the signal from a specific handset. The controller determines the position of the specific handset based on the measured power values received from the power detectors.

The positioning service of the present invention provides both the user ID of a measured handset and its actual position. How this is accomplished will be described in reference to the TDMA system illustrated in FIG. 1.

In a TDMA communication system, frequency and time slot are used to identify every user. Hence, if the handset is in an active state, that is, the handset and the base station are communicating (for example, when the handset is being used for voice/data communication), the controller can identify the handset according to the specific frequency and time slot of the handset allocated by the base station 14 or 24. On the other hand, if the handset is in an idle state, i.e. no voice/data communication is occurring, a page-response can be used to identify and position the handset because a specific time slot is allocated to the handset to perform the page-response function.

The handset position is determined by using power values measured by the plurality of power detectors and the known coordinate position of each power detector. Each power detector sequentially measures the power value of the signal in a certain frequency within a predetermined time, thereby obtaining the power values. The obtained power values are transferred to the controller of the base station via a cable or wireless path (e.g., Bluetooth).

Referring back to FIG. 1, when handset 1 is engaged in voice communication or the response page, the communication signal is transferred in a specific time slot in a specific frequency. Base station 14 or 24 identifies handset 1 according to the specific time slot and frequency.

Figure 2A:
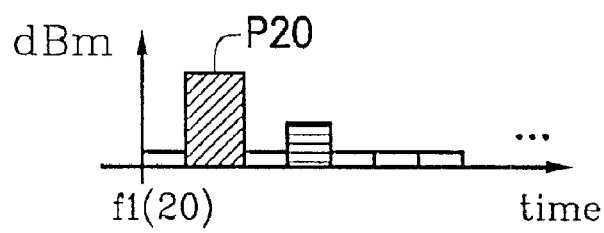
FIGS. 2a–2c are the diagrams respectively illustrating the time-power relationships of the received signals from the three closest power detectors of FIG. 1.
Figure 2B:
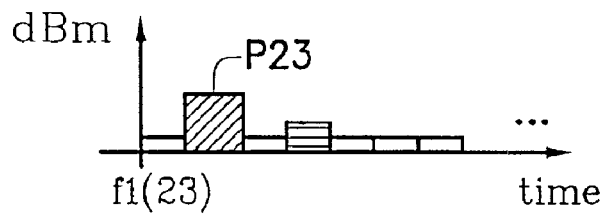
Figure 2C:
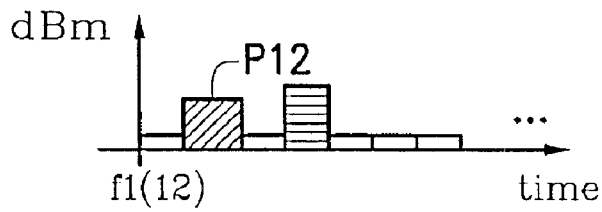

For the purpose of explanation, assume that each power detector scans the corresponding signal power value in the respective time slots of each frequency including the signal of handset 1, which is allocated to the second time slot of frequency 1. FIGS. 2a, 2b, and 2c respectively illustrate the time-power relationships of the received signals from three power detectors (20,23,12), closest ones to handset 1.

As shown in FIGS. 2a–2c, assume that three measured power values are greater than a preset threshold of the system, wherein power value P20 is measured by power detector 20 in the time slot of handset 1, power value P23 is measured by power detector 23, and power value P12 is measured by power detector 12. The position of handset 1 can be determined according to the three obtained power values and the known positions from three detectors used in the measurement.

In this example, assume that the position of power detector 20 is (x20,y20) in an xy plane, the position of power detector 23 is (x23,y23), and the position of power detector 12 is (x12,y12). These coordinate positions in conjunction with the three measured power values P20, P23, P12 can be used to calculate the coordinate position of handset 1 as follows:

$$x = \frac{x20*\sqrt{P20} + x23*\sqrt{P23} + x12*\sqrt{P12}}{\sqrt{P20} + \sqrt{P23} + \sqrt{P12}} \quad (1)$$

$$y = \frac{y20*\sqrt{P20} + y23*\sqrt{P23} + y12*\sqrt{P12}}{\sqrt{P20} + \sqrt{P23} + \sqrt{P12}} \quad (2)$$

In equations (1) and (2), the root-mean-square of the power values is used because the power values received by the power detectors are in inverse proportion to the square of distance between the handset and the corresponding power detector. Therefore, the root-mean-square is used as a weight when calculating the coordinate position of handset 1.

It is understood that this invention is not limited to using only the three maximum signal power values for the positioning in the equations (1) and (2). Any number of signal power values greater than a preset power threshold of system can be utilized for achieving the object of this embodiment, and it is not necessary to use the maximum values. However, to obtain an accurate calculation, values above a certain threshold must be used.

Figure 3:
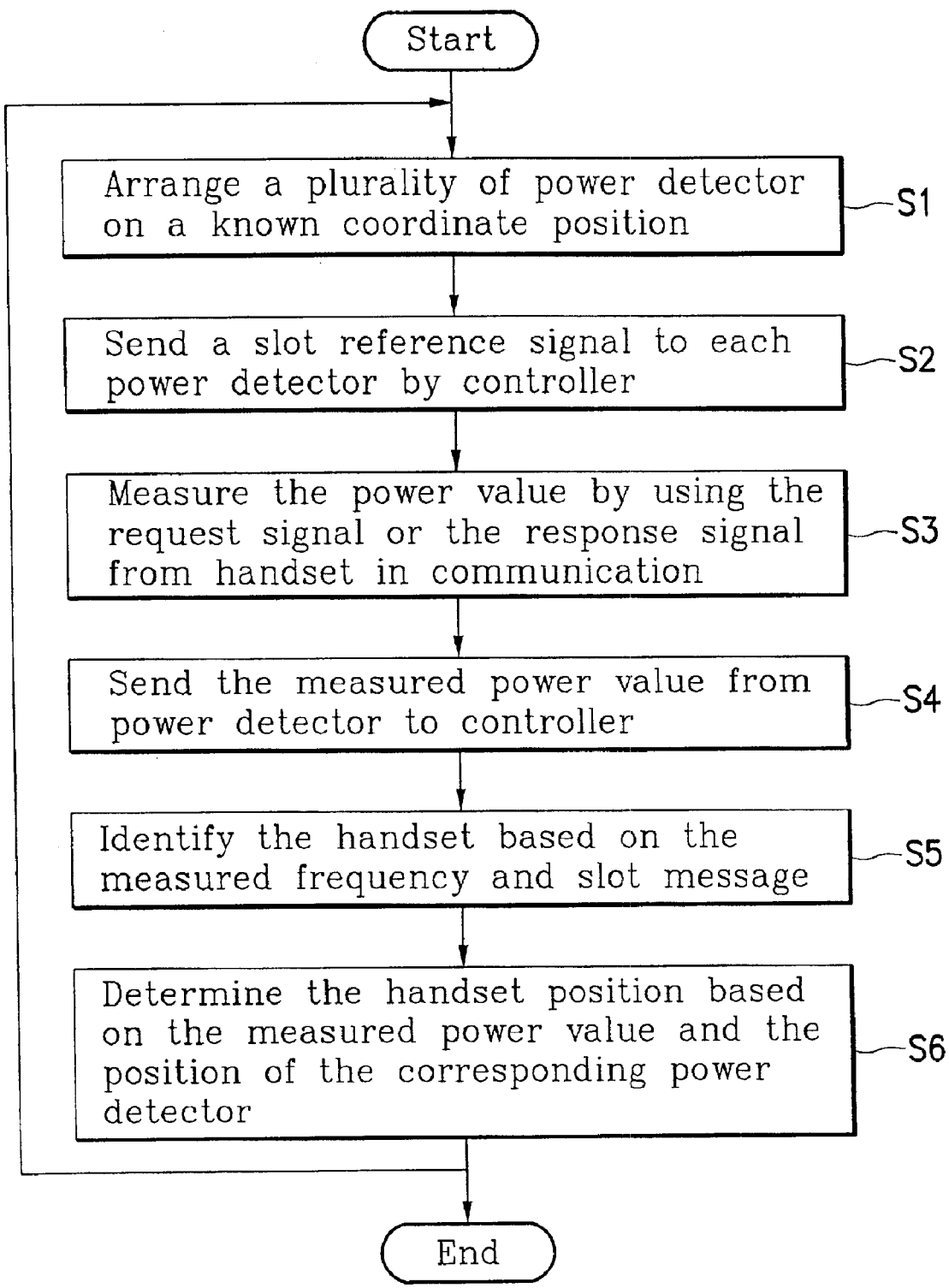
FIG. 3 is a flowchart illustrating the method of positioning a mobile station in a TDMA communication system according to an embodiment of this invention.

FIG. 3 illustrates a flowchart of the method of positioning a mobile station in a TDMA communication system according to this invention. In FIG. 3, a plurality of power detectors are disposed at known coordinate points (S1) as illustrated as FIG. 1. These power detectors are connected to the controller of a base station via a cable or a wireless path, so as to be able to transfer the power values measured by the power detectors to the controller for the calculation of a handset's position. Thereafter, the controller sends a clock reference signal to each power detector (S2) to synchronize them with the timing of the TDMA communication system to establish the starting position of a frame in the TDMA communication. The function of such a clock reference signal is to identify the handset to be positioned by the base station from the current detected frequency and time slot number.

Further, each power detector at a known position performs a power scan action in order to measure the power value of the received signal (S3) coming from the handset, wherein the received signal can be a communication signal (when active) or a response signal (when idle). The power detector transfers the measured power value to the controller of the base station (S4) corresponding to the frequency and time slot when measured. Therefore, the controller can identify the handset (S5) according to the signal of the measured frequency and time slot by comparing with the record of corresponding frequencies and time slots stored in the base station. Thereafter, the handset position is determined (S6) by, for example, using the equations (1) and (2) to calculate the coordinate value of the handset according to the measured power values and the corresponding positions of the power detectors, wherein the measured power values are greater than the preset threshold of the system. By this method, a positioning service is added to a general TDMA system.

The key aspect of this invention is that power detectors are used to measure the power value of the signal coming from a handset to be positioned and the coordinate position of the handset is calculated using these obtained power values by reference to the known positions of these power detectors. The implementation of this key aspect can be varied according to practical need. For example, the controller can be located inside the switching device in the TDMA communication system, and the power detectors can transfer all results to the controller when all scans of the frequencies and time slots are finished. In addition, the configuration of the power detectors in FIG. 1 is a 2-D arrangement, but the principle is suitable for a 3-D arrangement as well, where the third coordinate (z) calculation is similar to equations (1) and (2) as follows:

$$z = \frac{z20 * \sqrt{P20} + z23 * \sqrt{P23} + z12 * \sqrt{P12}}{\sqrt{P20} + \sqrt{P23} + \sqrt{P12}} \quad (3)$$

Figure 4:
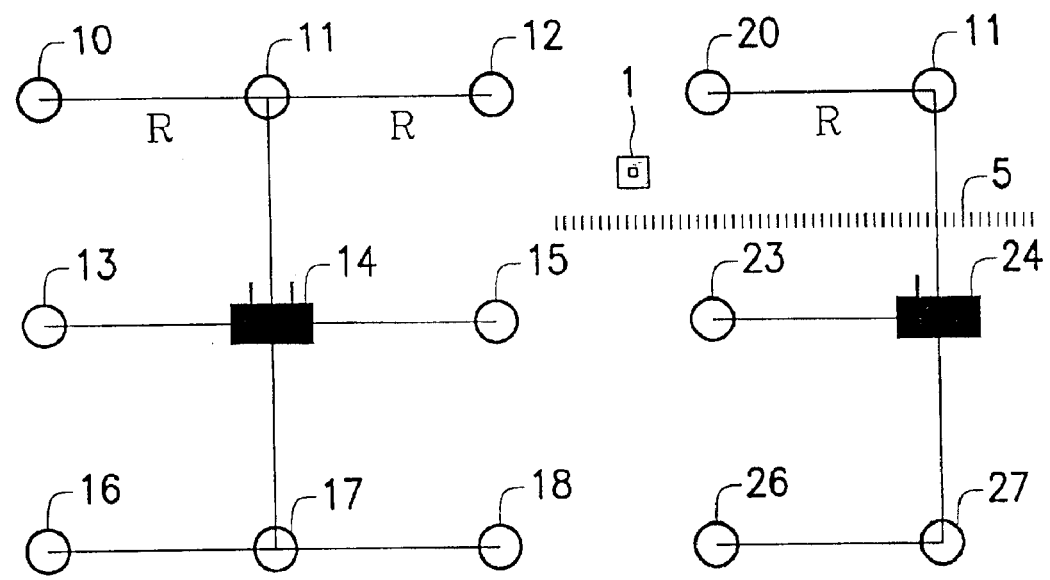
FIG. 4 is a schematic diagram illustrating the TDMA communication system positioning apparatus of FIG. 1 with the addition of an obstacle.

The environment in FIG. 1 is an ideal situation, namely an environment without obstacles. In fact, especially indoors, obstacles are unavoidable. Refer to FIG. 4, which schematically illustrates a known obstacle. As shown in FIG. 4, a wall 5 exists between power detectors 12, 20 and power detectors 15, 23. In FIG. 4, there is no influence on the measured power values when the power detectors are the same side as the handset 1, but significant influence when they are on the opposite side. In the later case, signal attenuation occurs when transmitting through the wall 5.

To address this problem, an extra step can be added wherein the relative position of the handset 1 and the wall 5 is checked to find out which side of the obstacle the handset 1 is located. Using power detector 23 as an example, a threshold value can be set. If the measured power value is greater than or equal the threshold, then the power detector 23 is assumed to be on the same side as the handset 1. If the measured power value of the power detector 23 is less than the threshold, the assumption is reversed, that is, the power detector 23 is on the opposite side of the obstacle as the handset 1. The correction of the handset 1 position is accomplished by adding a weight to equations (1) and (2) based on the relative position between the handset 1 and wall 5. By this means, the handset 1 position can be calculated in indoor environment including obstacles.

This invention offers advantages over the system used by the 3D-ID. In the 3D-ID system, a GPS receiver must decode the serial number of a handset ID, as well as transmit and receive the spread spectrum. However, in this invention, the power receiver is a simple RF signal receiver, and the signal power value is directly measured without a decoding step. Thus, there is no need for a frequency-down and baseband processing circuit. This lowers the cost. Further, by using the existing frequency and time slot of the TDMA system, a specific handset can be positioned without the encoding and decoding operation.

Figure 5:
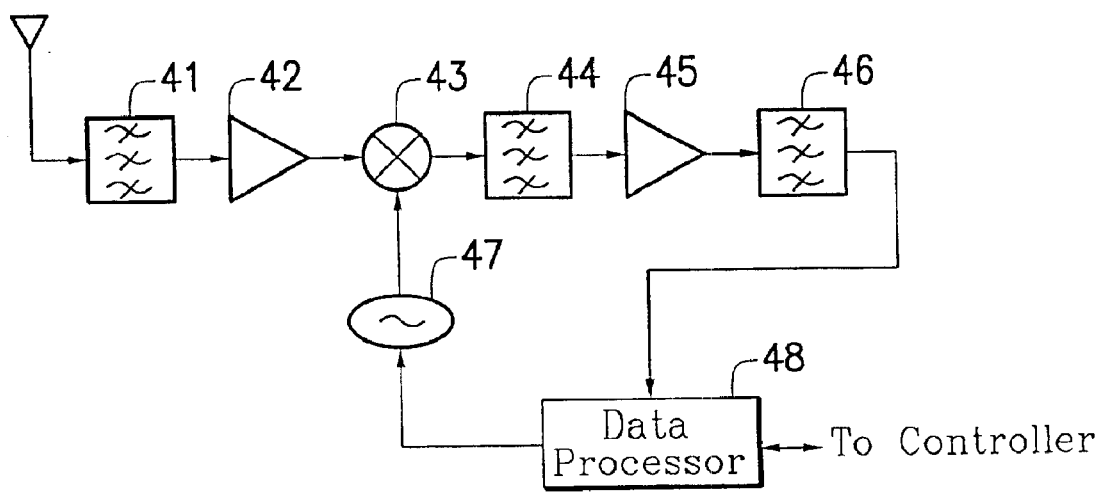
FIG. 5 is a schematic block diagram illustrating a power detector of an embodiment of this invention.

Refer to FIG. 5, a schematic block diagram illustrating a power detector of the first embodiment. As shown in FIG. 5, the power detector's internal circuit includes filters 41, 44, 46, low noise amplifier (LNA) 42, 45, a mixer 43, a local oscillator 47, a data processor 48. Such a configuration is a standard RF receiving circuit, and does not include a baseband processing circuit or RF signal emitting circuit. The sampling power data is transferred to the controller using an A/D converter and serial port (such as RS-232).

In a second embodiment of the present invention, the apparatus and corresponding method described above are the same as that of FIGS. 1 and 3 with the exception of step S6 of FIG. 3. In this embodiment, a greater number of power detectors are used to increase the density of the power detector configuration. If the space between the power detectors is smaller than a positioning error tolerance, the position of a specific handset is determined directly by the position of the power detector that has measured the maximum power value. Such a manner is suitable for positioning service in an area numerous obstacles.

Further, an advantage of this embodiment is that the positioning algorithm is simple. Although the added power detectors does incur additional cost, the cost of setting up the whole configuration of this invention is still much lower than other proposed techniques because the power detectors used are inexpensive.

In a third embodiment of the present invention, the apparatus and corresponding method described above are basically the same as that of FIGS. 1 and 3, again with the exception of step S6 of FIG. 3. In this embodiment, a look-up table is utilized to record all known positions (i.e., possible positions of a specific handset) and the measured power values for each power detector corresponding to each location. This method is applicable to an indoor environment with or without known obstacles by means of a pre-test, wherein all possible power values received by the detectors relative to a handset location are obtained. In practice, when the controller receives the power values from each detector, a comparison with the look-up table is performed, thereby finding out the position of the handset that is positioned within an allowable tolerance. An advantage of this embodiment is that the time for obtaining the position could be shorter than previous embodiments.

The present invention uses the popular TDMA communication system (such as GSM) as the platform to provide positioning service. Furthermore, it is particularly suited for indoor environment. The cost of this invention is lower than positioning systems of the conventional art because power detectors, and thus frequency-down and baseband processing circuits are not needed. In addition, a conventional microprocessor or microcontroller in a base station or in a switching device can also be used as the controller of this invention. As a result, the cost of implementing the system of this invention is further reduced.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. An apparatus for positioning a mobile station in a TDMA communication system, comprising:
    a plurality of power detectors, respectively located in a plurality of predetermined positions, for respectively measuring a plurality of power values of the signal generated by the mobile station in a preset channel and a preset time slot; and
    at least one controller, coupled to the power detectors, providing a time slot message signal to the plurality of power detectors for synchronizing the power measurement by the plurality of power detectors with time slots allocated by the TDMA communication system, identifying the mobile station according to the preset channel and the preset time slot, and determining the position of the mobile station according to at least one of the measured power values and the position of the corresponding detector.

2. The apparatus of claim 1, wherein the at least one controller is located on a base station of the TDMA communication system.

3. The apparatus of claim 1, wherein the at least one controller determines the position of the mobile station according to the position of the detector that has the maximum power value among the plurality of power values measured by the plurality of power detectors.

4. The apparatus of claim 1, wherein the at least one controller determines the position of the mobile station according to a three-point positioning technique using the power values measured by at least three of the plurality of power detectors and the positions of the corresponding at least three power detectors.

5. The apparatus of claim 4, wherein the power values measured by the plurality of power detectors are corrected by a predetermined weight according to their relative position to an obstacle.

6. The apparatus of claim 1, wherein the at least one controller further includes a look-up table recording the relationship between all known positions of the mobile station and the measured power values for each power detector corresponding to each location, wherein the position of the mobile station is determined by comparing the look-up table with the plurality of power values measured by the plurality of power detectors.

7. The apparatus of claim 1, wherein the plurality of power detectors are connected to the at least one controller by a wireless path.

8. The apparatus of claim 1, wherein the plurality of power detectors perform the power measurement by using the communication signal between the mobile station and a base station of the TDMA communication system.

9. The apparatus of claim 1, wherein the plurality of power detectors perform the power measurement by using the response signal from the mobile station when a base station of the TDMA communication system pages the mobile station.

10. The apparatus of claim 1, wherein the power detectors are RF receivers for directly measuring the RF power.

11. A method of positioning a mobile station in a TDMA communication system, comprising the steps:
    providing a plurality of power detectors respectively located at a plurality of predetermined positions;
    coupling at least one controller to the plurality of power detectors and transmitting a time slot message signal to the plurality of power detectors for synchronizing the power measurement by the plurality of power detectors with time slots allocated by the TDMA communication system;
    respectively measuring a plurality of power values of the signal generated by the mobile station in a preset channel and a preset time slot;
    identifying the mobile station according to the preset channel and the preset time slot; and
    determining the position of the mobile station according to at least one of the measured power values and the position of the corresponding detector.

12. The processing method of claim 4, wherein in the step of determining the position of the mobile station, the position of the mobile station is determined according to the position of the detector that has the maximum power value among the plurality of power values measured by the plurality of power detectors.

13. The processing method of claim 11, wherein in the step of determining the position of the mobile station, the position of the mobile station is determined according to a three-point positioning technique using the power values measured by at least three of the plurality of power detectors and the positions of the corresponding at least three power detectors.

14. The processing method of claim 13, wherein the power values measured by the plurality of power detectors are corrected by a predetermined weight according to their relative position to an obstacle.

15. The processing method of claim 11, wherein in the step of determining the position of the mobile station, further comprising the steps:
    providing a look-up table recording the relationship between all known positions of the mobile station and the measured power values for each power detector corresponding to each location; and
    determining the position of the mobile station by comparing the look-up table with the plurality of power values measured by the plurality of power detectors.

16. The processing method of claim 11, wherein in the step of measuring a plurality of power values of a signal generated by the mobile station, the plurality of power detectors perform the power measurement using the communication signal between the mobile station and a base station of the TDMA communication system.

17. The processing method of claim 11, wherein in the step of measuring a plurality of power values of a signal generated by the mobile station further comprises the steps:
    paging the mobile station from a base station of the TDMA communication system; and
    performing the power measurement by using the response signal from the mobile station paged.

18. The apparatus of claim 1, wherein the at least one controller determines the position of the mobile station according to the position of the detector that has the measured power value which is greater than a preset power threshold of the TDMA communication system.

* * * * *